(12) United States Patent
Macnaughtan et al.

(10) Patent No.: US 8,355,737 B2
(45) Date of Patent: Jan. 15, 2013

(54) ENHANCED MOBILE LOCATION

(75) Inventors: Malcolm D. Macnaughtan, Cherrybrook (AU); Christopher R. Drane, Pymble (AU); Craig A. Scott, Mortdale (AU)

(73) Assignee: WaveMarket, Inc., Emeryville, CA (US)

( * ) Notice: Subject to any disclaimer, the term of this patent is extended or adjusted under 35 U.S.C. 154(b) by 762 days.

(21) Appl. No.: 11/886,515

(22) PCT Filed: Mar. 20, 2006

(86) PCT No.: PCT/AU2006/000348
§ 371 (c)(1),
(2), (4) Date: May 19, 2008

(87) PCT Pub. No.: WO2006/096923
PCT Pub. Date: Sep. 21, 2006

(65) Prior Publication Data
US 2009/0047973 A1    Feb. 19, 2009

(30) Foreign Application Priority Data
Mar. 18, 2005   (AU) ................ 2005901352

(51) Int. Cl.
*H04W 24/00*      (2009.01)
(52) U.S. Cl. ............... 455/456.1; 455/456.2; 455/456.3; 455/456.4; 455/456.5; 455/456.6
(58) Field of Classification Search ..... 455/456.1–456.6
See application file for complete search history.

(56) References Cited

U.S. PATENT DOCUMENTS

| | | | |
|---|---|---|---|
| 5,045,861 A | 9/1991 | Duffett-Smith et al. | |
| 5,524,136 A | 6/1996 | Barnoy et al. | |
| 5,564,079 A * | 10/1996 | Olsson | 455/456.3 |
| 5,666,651 A | 9/1997 | Wang | |
| 5,950,125 A | 9/1999 | Buhrmann et al. | |
| 5,969,679 A | 10/1999 | Bolliger | |
| 5,999,126 A | 12/1999 | Ito | |
| 6,041,236 A | 3/2000 | Bernardin et al. | |
| 6,052,064 A * | 4/2000 | Budnik et al. | 340/7.24 |
| 6,061,021 A | 5/2000 | Zibell | |
| 6,073,089 A | 6/2000 | Baker et al. | |

(Continued)

FOREIGN PATENT DOCUMENTS

DE    29919376 U1    2/2000

(Continued)

OTHER PUBLICATIONS

M. Hata, "Empirical formula for propagation loss in land mobile radio services" IEEE Transactions on Vehicular Technology, vol. VT-29, pp. 317-325, Aug. 1980.

(Continued)

*Primary Examiner* — Nathan Mitchell
(74) *Attorney, Agent, or Firm* — Dovas Law, P.C.

(57) ABSTRACT

A method for obtaining a local path loss versus range model in a radio communications network is disclosed. The method comprises obtaining at least one path loss measurement and an associated range measurement at an approximated location of a mobile radio terminal within the radio communications network and applying this to a path loss versus range model to obtain the local path loss versus range model. The local model may also be used to obtain a more accurate location of the mobile radio terminal within the radio communications network.

20 Claims, 3 Drawing Sheets

U.S. PATENT DOCUMENTS

| | | | |
|---|---|---|---|
| 6,088,598 | A | 7/2000 | Marsolais |
| 6,097,939 | A | 8/2000 | Jacobs |
| 6,104,344 | A | 8/2000 | Wax et al. |
| 6,167,265 | A | 12/2000 | Kim et al. |
| 6,201,499 | B1 | 3/2001 | Hawkes et al. |
| 6,263,208 | B1 | 7/2001 | Chang et al. |
| 6,266,534 | B1* | 7/2001 | Raith et al. ............ 455/456.3 |
| 6,269,246 | B1 | 7/2001 | Rao et al. |
| 6,330,600 | B1 | 12/2001 | Matchefts et al. |
| 6,356,763 | B1 | 3/2002 | Kangas et al. |
| 6,360,094 | B1 | 3/2002 | Satarasinghe |
| 6,393,294 | B1 | 5/2002 | Perez-Breva et al. |
| 6,411,819 | B1 | 6/2002 | Gutowski |
| 6,449,257 | B1 | 9/2002 | Choi |
| 6,449,486 | B1 | 9/2002 | Rao |
| 6,496,701 | B1* | 12/2002 | Chen et al. ............ 455/456.5 |
| 6,529,165 | B1 | 3/2003 | Duffett-Smith et al. |
| 6,556,842 | B1 | 4/2003 | Ericsson |
| 6,560,442 | B1 | 5/2003 | Yost et al. |
| 6,567,381 | B1 | 5/2003 | Jeon et al. |
| 6,591,116 | B1 | 7/2003 | Laurila et al. |
| 6,631,262 | B1 | 10/2003 | Wee |
| 6,711,404 | B1* | 3/2004 | Arpee et al. ............ 455/423 |
| 6,728,539 | B2 | 4/2004 | Kuwahara |
| 6,748,224 | B1 | 6/2004 | Chen et al. |
| 6,782,265 | B2 | 8/2004 | Perez-Breva et al. |
| 6,799,046 | B1 | 9/2004 | Tang |
| 6,834,180 | B1* | 12/2004 | Marshall ............ 455/67.11 |
| 6,856,805 | B1* | 2/2005 | Raaf ............ 455/436 |
| 6,859,654 | B1 | 2/2005 | Reynolds et al. |
| 6,947,734 | B1 | 9/2005 | Toubassi |
| 6,947,835 | B2 | 9/2005 | Kaplan et al. |
| 6,950,664 | B2 | 9/2005 | Chen et al. |
| 6,961,587 | B1 | 11/2005 | Vilppula et al. |
| 7,031,722 | B2 | 4/2006 | Naghian |
| 7,096,115 | B1 | 8/2006 | Groth et al. |
| 7,158,790 | B1 | 1/2007 | Elliott |
| 7,233,800 | B2 | 6/2007 | Laroia et al. |
| 7,289,763 | B2 | 10/2007 | Dennison et al. |
| 7,505,433 | B2 | 3/2009 | Yaqub et al. |
| 7,668,832 | B2 | 2/2010 | Yeh et al. |
| 7,697,920 | B1 | 4/2010 | McClain |
| 7,751,827 | B2 | 7/2010 | Poykko et al. |
| 2001/0022558 | A1* | 9/2001 | Karr et al. ............ 342/450 |
| 2002/0042268 | A1 | 4/2002 | Cotanis |
| 2002/0042269 | A1 | 4/2002 | Cotanis |
| 2002/0101834 | A1* | 8/2002 | Stanley ............ 370/329 |
| 2002/0111772 | A1 | 8/2002 | Skidmore et al. |
| 2002/0128019 | A1 | 9/2002 | Ben-Yair et al. |
| 2002/0164997 | A1 | 11/2002 | Parry |
| 2002/0168989 | A1 | 11/2002 | Dooley et al. |
| 2002/0173275 | A1 | 11/2002 | Coutant |
| 2002/0193150 | A1 | 12/2002 | Pritchard |
| 2003/0008668 | A1 | 1/2003 | Perez-Breva et al. |
| 2003/0032404 | A1 | 2/2003 | Wager et al. |
| 2003/0040318 | A1 | 2/2003 | Fattouche |
| 2003/0043941 | A1* | 3/2003 | Johnson et al. ............ 375/345 |
| 2003/0060214 | A1 | 3/2003 | Hendrey et al. |
| 2003/0078042 | A1 | 4/2003 | Miriyala et al. |
| 2003/0078055 | A1 | 4/2003 | Smith et al. |
| 2003/0109274 | A1 | 6/2003 | Budka et al. |
| 2003/0119501 | A1 | 6/2003 | Kim |
| 2003/0125031 | A1 | 7/2003 | Sung Lim et al. |
| 2003/0147362 | A1 | 8/2003 | Dick et al. |
| 2003/0148771 | A1 | 8/2003 | de Verteuil |
| 2003/0186710 | A1 | 10/2003 | Muhonen et al. |
| 2003/0208589 | A1 | 11/2003 | Yamamoto |
| 2004/0018835 | A1 | 1/2004 | Myers et al. |
| 2004/0037258 | A1 | 2/2004 | Scherzer et al. |
| 2004/0116111 | A1* | 6/2004 | Saunders ............ 455/423 |
| 2004/0132464 | A1 | 7/2004 | Poykko et al. |
| 2004/0152470 | A1 | 8/2004 | Spain |
| 2004/0157621 | A1 | 8/2004 | Yamasaki et al. |
| 2004/0160365 | A1 | 8/2004 | Riley et al. |
| 2004/0203717 | A1 | 10/2004 | Wingrowicz |
| 2004/0203880 | A1 | 10/2004 | Riley |
| 2004/0203885 | A1 | 10/2004 | Quaid |
| 2004/0248589 | A1 | 12/2004 | Gwon et al. |
| 2005/0012613 | A1 | 1/2005 | Eckstein et al. |
| 2005/0040968 | A1 | 2/2005 | Damarla et al. |
| 2005/0044564 | A1 | 2/2005 | Stopniewicz et al. |
| 2005/0066325 | A1 | 3/2005 | Mori et al. |
| 2005/0113117 | A1 | 5/2005 | Bolin et al. |
| 2005/0134696 | A1 | 6/2005 | Nath et al. |
| 2005/0136938 | A1 | 6/2005 | Kang |
| 2005/0169183 | A1 | 8/2005 | Lakkakorpi |
| 2005/0192031 | A1 | 9/2005 | Vare |
| 2005/0210342 | A1 | 9/2005 | Schwagmann |
| 2005/0227683 | A1 | 10/2005 | Draluk et al. |
| 2005/0239478 | A1 | 10/2005 | Spirito |
| 2005/0282540 | A1* | 12/2005 | Motamedi et al. ............ 455/423 |
| 2005/0282544 | A1 | 12/2005 | Oommen et al. |
| 2005/0283540 | A1 | 12/2005 | Fux et al. |
| 2006/0019665 | A1* | 1/2006 | Aghvami et al. ............ 455/444 |
| 2006/0019679 | A1* | 1/2006 | Rappaport et al. ......... 455/456.5 |
| 2006/0025068 | A1 | 2/2006 | Regan et al. |
| 2006/0025158 | A1 | 2/2006 | Leblanc et al. |
| 2006/0052057 | A1 | 3/2006 | Perrson et al. |
| 2006/0064346 | A1 | 3/2006 | Steenstra et al. |
| 2006/0087425 | A1 | 4/2006 | Haeberlen et al. |
| 2006/0221901 | A1 | 10/2006 | Yaqub et al. |
| 2006/0227045 | A1 | 10/2006 | Sheynblat |
| 2006/0234701 | A1 | 10/2006 | Wang et al. |
| 2006/0270421 | A1 | 11/2006 | Phillips et al. |
| 2007/0001867 | A1 | 1/2007 | Rowe et al. |
| 2007/0087764 | A1 | 4/2007 | Buckley et al. |
| 2007/0121520 | A1 | 5/2007 | Shrikhande et al. |
| 2007/0123268 | A1 | 5/2007 | Parata |
| 2007/0208495 | A1 | 9/2007 | Chapman et al. |
| 2007/0270168 | A1 | 11/2007 | Sheynblat |
| 2007/0297346 | A1 | 12/2007 | Huismann et al. |
| 2008/0004037 | A1 | 1/2008 | Achlioptas et al. |
| 2008/0061967 | A1 | 3/2008 | Corrado |
| 2009/0160939 | A1 | 6/2009 | Fernandez et al. |
| 2009/0182630 | A1 | 7/2009 | Otto et al. |
| 2010/0167725 | A1 | 7/2010 | Noldus et al. |
| 2011/0244919 | A1 | 10/2011 | Aller et al. |

FOREIGN PATENT DOCUMENTS

| | | |
|---|---|---|
| EP | 0431956 A2 | 7/1990 |
| EP | 0874248 A2 | 10/1998 |
| EP | 0936758 A2 | 8/1999 |
| EP | 0982964 A2 | 3/2000 |
| EP | 1030531 A1 | 8/2000 |
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| GB | 2352134 A | 1/2001 |
| GB | 2358500 A | 7/2001 |
| GB | 2364617 A | 1/2002 |
| JP | 07-255079 A | 10/1995 |
| JP | 08-265824 | 10/1996 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | WO 95/35636 A1 | 12/1995 |
| WO | WO 97/11384 A | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |
| WO | WO 00/18148 A | 3/2000 |
| WO | WO 00/28755 A1 | 5/2000 |
| WO | WO 0049826 | 8/2000 |
| WO | WO 01/03372 A | 1/2001 |
| WO | WO 01/37601 | 5/2001 |
| WO | WO 01/99082 A2 | 12/2001 |
| WO | WO 0195592 | 12/2001 |
| WO | WO 02/47421 | 6/2002 |

| | | |
|---|---|---|
| WO | WO 02/073997 A1 | 9/2002 |
| WO | WO 02/082850 | 10/2002 |
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105619 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2007/115777 A1 | 10/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

T. Roos, P. Myllymaki, and H. Tirri, "A statistical modeling approach to location estimation," IEEE Transactions on Mobile Computing vol. 1, pp. 59-69, Jan. 2002.
T. Halonen J. Romero and J. Melero, GSM, GPRS and EDGE Performance; Evolution Towards SG/UMTS. John Wiley and Sons, 2nd ed., 2003.
L.M. Correia, Wireless Flexible Personalized Communications: COST 259 European Co-Operation in Mobile Radio Research. Wiley 2001.
IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb 1988.
3rd Generation Partnership Program, "3GPP TR 25.942 Radio Frequency (RF) System Scenarios," tech. rep., 3GPP, 2004.
Schwartz et al., "On the Distribution and Moments of Power Sums with Logonormal Components", Bell Sys. Tech, J., vol. 61, No. 7, pp. 1441-1463, Sep. 1982.
Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.
W.C.Y. Lee, Mobile Communications Engineering. McGraw-Hill, 1982.
Bernardin et al., "Cell Radius Inaccuracy: A New Measure of Coverage Reliability", IEEE Transactions on Vehicular Technology, vol. 47, No. 4, Nov. 1998.
W.H. Press S. A. Teukolsky, W.T. Vetterling & B.P. Flannery, "Numerical Recipes in C++; The Art of Scientific Computing", 2nd Ed, Feb. 2002, Cambridge University Press.
C.R. Drane, Positioning Systems—A Unified Approach, Lecture Notes in Control and Infromation Sciences, Springer Verlag, Oct. 1992.
P.L.H.A.S. Fischer, "Evaluation of Positioning Measurement Systems," T1P1.5/97-110, Dec. 1997.
A.M. Zoubir and B. Boobash, "The Bootstrap and Its Application in Signal Processing," IEEE Signal Processing Magazine, 15(1):56-76, Jan. 1998.
Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.
Section 2.7 of Mobile Radio Communications 2nd Ed. Steele and Hanzo, IBSN 047197806X,J. Wiley & Sons Ltd., 1999.
B. Matsumori T1P1.5/98-600 "Radio Camera System and Location Fingerprinting Technology", Presentation Submission to Location Standards Working Group T1P1.5 by U.S. Wireless 1998.
Annex I of GSM 05.05 "Digital cellular Telecommunication System (Phase 2)", Radio Transmission and Reception, 2001.
S.R. Saunders & A. Aragon-Zavala, Antennas and Propagation for Wireless Communications Systems: 2nd Ed., Wiley 2007.
Doru-Petru Munteanu, Onoriu Bradeanu, Petrica Ciotirnae, Constantin-Julian Vizitiu: "Zone Profile Generation for Location Based Services and Traffic Analysis", 12th WSEAS International Conference on Communications, Heraklion, Greece, Jul. 23-25, 2008, pp. 386-390.
Specification 3GPP TS 31.111—Sections 6.4, 6.616, 6.6.21 and 6.6.22, Oct. 2010.
"Computational Geometry in C (Cambridge Tracts in Theoretical Computer Science)", Joseph O'Rourke, Cambridge University Press; 2000 edition, ISBN 0521609765.
European Search Report dated Nov. 4, 2010 for EP 08714391.3.
International Search Report dated Sep. 20, 2004 for PCT/AU2004/000983.
European Search Report dated Mar. 15, 2007 for EP 04737602.5.
International Search Report dated Dec. 5, 2005 for PCT/AU2005/001358.
International Search Report dated May 7, 2008 for PCT/AU2008/000344.
International Search Report dated Apr. 26, 2006 for PCT/AU2006/000347.
International Search Report dated Apr. 26, 2006 for PCT/AU2006/000348.
European Search Report dated Feb. 19, 2010 for EP 06721361.1.
International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
International Search Report dated Jan. 15, 2009 for PCT/AU2008/001783.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
European Search Report dated Feb. 19, 2009 for EP 06705017.9.
3GPP-TR-23.806, "Voice Call Continuity Between CA and MS Study", tech. rep. 3GPP, 2005.
OMA Download Architecture—Version 1.0, Jun. 25, 2004.
Mir et. al, "A Zone-Based Location Service for Mobile Ad Hoc Networks", 1NCC 2004, Jun. 2004.
3GPP TR05.08, "Radio Subsystem Link Control", Nov. 2005.

Specification 3GPP TS 03.22, "Radio Access Network; Functions Related to Mobile Station(MS) in Idle Mode and Group Receive Mode", 1999.

Specification 3GPP TS 23.048, "Technical Specification Group Core Network and Terminals; Security Mechanisms for the (U)SIM Application Toolkit", 2005-2006.

Specification 3GPP TS 25.304 "User Equipment (UE) Procedures in Idle Mode and Procedures for Cell Reselection in Connected Mode", 2011.

International Search Report of PCT/AU2006/001577 dated Nov. 28, 2006.

International Search Report dated Nov. 3, 2011 for PCT/AU2011/001038.

European Search Report dated Mar. 12, 2012 for European Patent Application 06804431.2.

European Search Report dated Mar. 2, 2012 for European Patent Application 09729670.1.

European Search Report dated Feb. 24, 2012 for European Patent Application 09729862.4.

European Search Report dated Feb. 22, 2012 for European Patent Application 08714391.3.

European Search Report dated Mar. 12, 2012 for European Patent Application 06790414.4.

European Search Report dated Mar. 9, 2012 for European Patent Application 08800009.6.

European Search report dated Jul. 25, 2012 for European Patent Application 06790349.2.

* cited by examiner

Page header: US 8,355,737 B2

ENHANCED MOBILE LOCATION

CROSS REFERENCE TO RELATED APPLICATION

This application is the National Phase application of International Application No. PCT/AU2006/000348, filed 20 Mar. 2006, which claims priority to Australian Application No. 2005901352, filed 18 Mar. 2005. Each of these applications, in its entirety, is incorporated herein by reference.

TECHNICAL FIELD

This invention relates to path loss models and methods and apparatus for locating a mobile radio terminal within a radio communications network using path loss models.

BACKGROUND TO THE INVENTION

This application claims priority from Australian Provisional Patent Application No. 2005901352, the entire content of which is hereby incorporated by reference.

The most common mobile location systems at present are cell ID and enhanced cell ID systems. These systems use existing measurements within the mobile network. As a result they are able to locate existing handsets without requiring the modifications typically required by higher accuracy techniques.

The measurements available for use by such systems commonly include the identity of the serving cell, one or more round trip delays from a cell and signal levels measured by the mobile radio terminal (or mobile) from beacon channels broadcast by neighbouring cells.

Signal level measurements are useful in location calculation because received signal levels decrease with increasing range from the transmitter. Therefore, knowing the transmitted signal level and having measured the received signal level at the mobile, the attenuation or path loss provides an indication of the range between the transmitter and receiver.

One difficulty in practical systems is due to the fact that the attenuation is not a simple function of range. It is affected by a variety of factors including the specific frequency of the signal as well as the nature of the propagation channel. Relationships between path loss and range can be approximated by a closed form expression which yields useful results over some limited range of conditions. A difficulty with using signal levels in a specific location calculation remains however because such models are very general, useful more for system level modelling and radio network planning. Actual measurements in any particular location may deviate by a large margin.

One method that has been applied for using signal level measurements in mobile location is to perform a detailed survey and populate a database. This method however, suffers from the disadvantage of high cost and effort associated with populating the database. The area to be served by the system (for instance a city) has to be surveyed on a fine grid. Moreover if there are any significant changes in the actual path loss characteristics the survey has to be repeated. Such changes might arise from a change of season if there is a significant amount of foliage in the area. Other causes include the erection of a building or other edifice and maintenance of the mobile network.

In addition to the difficulties with obtaining a suitable model, further difficulties arise because the signal levels measured by a mobile are also affected by random (and uncorrelated with range) variations due to fading as well as measurement inaccuracies in the mobile. It is possible for the mobile to average multiple measurements in order to reduce the effects of noise and fast fading, however slow fading variations and biases due to the receiver remain.

These problems can be further exacerbated by user behaviour on the signal levels that are received. The way in which a user holds a mobile and also the way in which the mobile is positioned with respect to the head when in use can change the path loss by up to 10 dB. Furthermore, the user may put the terminal inside a briefcase or bag causing further signal loss. Further variations arise when a user enters a vehicle due to the shielding by the vehicle body. Yet further differences can arise depending on whether the phone is simply placed inside the vehicle or whether it is connected to a car kit with a roof or window mounted antenna. Again the differences in such cases can be as much as 10 dB. Still further variations occur when a mobile is operated inside a building compared to outdoors. All of these effects produce significant deviations in the path loss at a given range from what might be predicted using a general model of path loss versus range.

It is accordingly an object of the present invention to provide an improved path loss versus range model for a radio communications network, or to at least provide an alternative method of providing a path loss versus range model. The path loss versus range model may be used to calculate a location of a radio mobile terminal in the radio communications network.

SUMMARY OF THE INVENTION

According to one aspect of the present invention, there is provided method for obtaining a local path loss versus range model for a radio communications network, the method comprising:
  obtaining at least one path loss and corresponding range measurement at an approximated mobile radio terminal location in the radio communications network; and
  applying the at least one path loss and corresponding range measurement to a path loss versus range model to obtain the local path loss versus range model for the approximated mobile radio terminal location.

In one form, the step of obtaining the at least one path loss and corresponding range measurement comprises obtaining a range of the mobile radio terminal at the approximated location of the mobile radio terminal from one or more transmitters in the radio communications network.

In a further form, the step of obtaining the at least one path loss measurement measuring a signal level at the mobile radio terminal transmitted by the one or more transmitters.

In a further aspect, the path loss versus range model comprises a range dependent component.

In another aspect, the path loss versus range model comprises a non range dependent component.

In a further form, the path loss versus range model comprises both a range dependent and a non range dependent component.

In one form, the path loss versus range model is of the form:

$$L_p(r) = \beta + \alpha * 10 * \log 10\,(r)$$

Where:
  $L_p$ is the path loss given in units of decibels;
  $\beta$ is a non-range dependent term characteristic of the local environment;
  $\alpha$ is the parameter defining the range dependence; and
  r is the range.

In one form, the method further comprises estimating the range dependent component and/or the non-range dependent component of the path loss versus range model.

In another aspect, β comprises a general non-range dependent component $\beta_{gen}$ and a user non-range dependent component $\beta_{user}$.

In one aspect of the invention, α is obtained from published data.

In another aspect, α is obtained from one or more measurements from the radio mobile terminal.

In a further aspect, α is obtained from one or more measurements from a plurality of radio mobile terminals in the vicinity of the radio mobile terminal.

In yet a further aspect α is obtained from one or more measurements from the radio mobile terminal and from one or more measurements from a plurality of radio mobile terminals in the vicinity of the radio mobile terminal.

In one form, β is obtained using the obtained value for α.

According to another aspect of the present invention, there is provided a method for obtaining a local path loss versus range model for a radio communications network, the method comprising:

obtaining an approximate location of the mobile radio terminal in the radio communications network;
  obtaining at least one path loss and corresponding range measurement at the approximated mobile radio terminal location in the radio communications network; and
  applying the at least one path loss and corresponding range measurement to a path loss versus range model to obtain the local path loss versus range model for the approximated mobile radio terminal location.

In one form of this aspect, the step of obtaining the approximate location of the mobile radio terminal comprises use of one or more of the following parameters:

one or more serving cell identifiers;
  one or more round trip delay measurements relating to a serving cell;
  one or more Neighbour cell identifiers; and
  one or more RTDs.

In an alternative form, the step of obtaining the approximate location of the mobile radio terminal comprises obtaining the approximate location of the mobile radio terminal externally from the radio communications network.

According to a further aspect of the present invention, there is provided a method of locating a mobile radio terminal in a radio communications network, the method comprising:

calculating the location of the mobile radio terminal using the local path loss model obtained from the method of any one of claims 1 to 17.

According to yet a further aspect of the present invention there is provided a radio communications network comprising:

means for obtaining at least one path loss and corresponding range measurement at an approximated mobile radio terminal location in the radio communications network; and
  means for applying the at least one path loss and corresponding range measurement to a path loss versus range model to obtain the local path loss versus range model for the approximated mobile radio terminal location. In one form, the radio communications network further comprising means for approximating the mobile radio terminal location in the radio communications network.

In a further form, the radio communications network further comprising means for calculating a location of the mobile radio network terminal using the local path loss versus range model.

According to a further aspect of the present invention, there is provided a machine readable medium containing instructions to cause a machine to perform the method of any one or more of the methods of the preceding aspects of the present invention.

BRIEF DESCRIPTION OF THE DRAWINGS

Different aspects of the present invention will now be described in detail with reference to the following drawings in which.

DETAILED DESCRIPTION

The present invention will now be described in detail with reference to one or more embodiments of the invention, examples of which are illustrated in the accompanying drawings. The examples and embodiments are provided by way of explanation only and are not to be taken as limiting to the scope of the invention. Furthermore, features illustrated or described as part of one embodiment may be used with one or more other embodiments to provide a further new combination.

It will be understood that the present invention will cover these variations and embodiments as well as variations and modifications that would be understood by the person skilled in the art.

Figure 1:
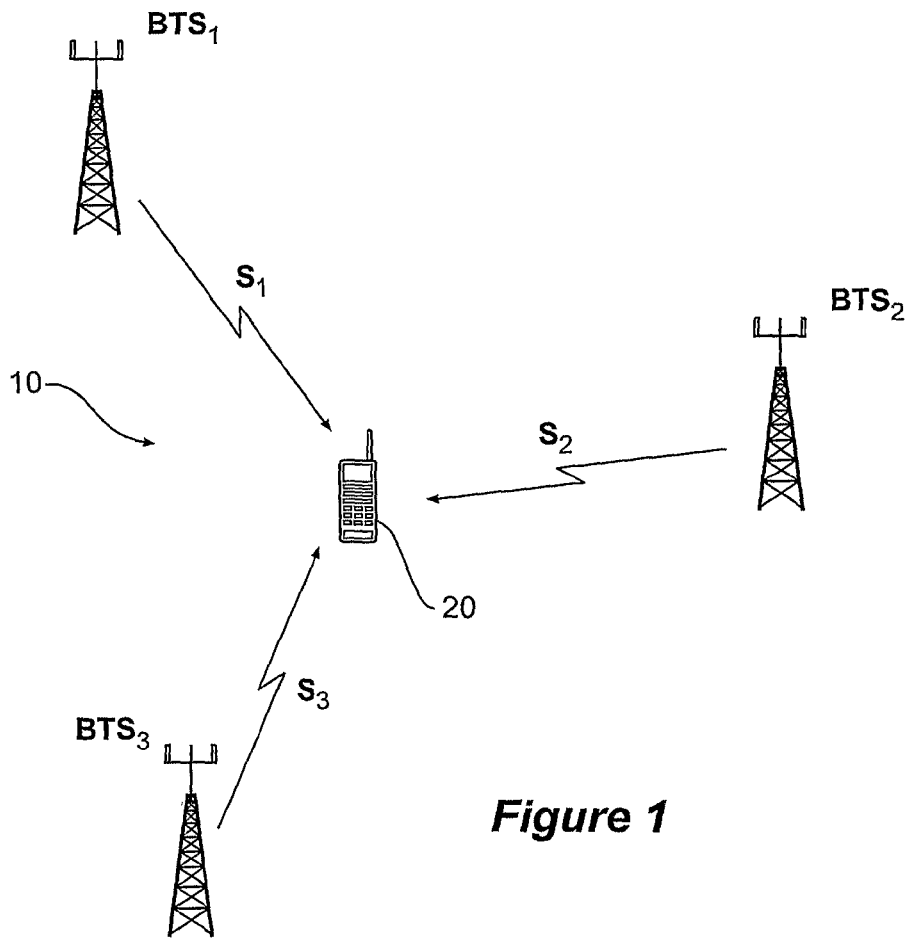
FIG. 1—shows one possible arrangement of elements used in the method of one aspect of the present invention.

FIG. 1 shows one possible arrangement of elements in a radio communications network 10, which includes transmitters or Base Transmitting Stations $BTS_1$, $BTS_2$ and $BTS_3$, each transmitting radio signals within the network 10. Within the network 10 is a mobile radio terminal, or mobile, 20. In one aspect, mobile 20 is able to detect radio signals $S_1$, $S_2$ and $S_3$ transmitted by each of $BTS_1$, $BTS_2$ and $BTS_3$ respectively. At any given time, mobile 20 is located at a distance or range r1, r2 and r3 from $BTS_1$, $BTS_2$ and $BTS_3$ respectively.

For each of signals $S_1$, $S_2$ and $S_3$, there will be a loss in the power of the signal between its transmission from its respective BTS and the mobile. This loss is referred to as a path loss.

There are many possible forms for a model expressing the relationship between path loss and range. The method hereindescribed could be applied to any such model. As used in one form of the present invention, the formulation common to models such as the free-space model, two-ray model, Hata model, and the COST-231 model has the form (in the logarithmic domain):

$$L_p(r) = \beta + \alpha * 10 * \log 10\,(r) \tag{1}$$

Where:

$L_p$ is the path loss given in units of decibels;

β is a non-range dependent term characteristic of the local environment, representing factors including transmit and receive antenna heights, and carrier frequency dependent corrections;

α is the parameter defining the range dependence; and r is the range.

α represents the increase in path loss as a function of range, and thus represents the phenomena experienced by all mobiles in a given region. By contrast, β represents non-range dependent effects.

There are many alternative mathematical forms for the model relating path loss and range. For instance a different base logarithm may be applied with corresponding different parameters. In one aspect, the present invention can be applied to any model which includes both a range dependent and a non range dependent component. In other aspects, the model used may include only one or the other of the range dependent and the non range dependent components.

β can further be constituted by $\beta_{user}$, denoting the user dependent effects, caused for instance by placing the mobile in a briefcase and by the more general $\beta_{gen}$. $\beta_{gen}$ denotes the effects that are likely to be common to all mobiles operating in the vicinity and include effects such as shadow fading and local elevation.

According to an aspect of the present invention, when computing the location of a mobile radio terminal 20, it is possible to obtain a model that represents, with greater accuracy, the relationship between the path loss and the propagation range of the signals received by that mobile 20 from BTSs in neighbouring cells.

Figure 2:
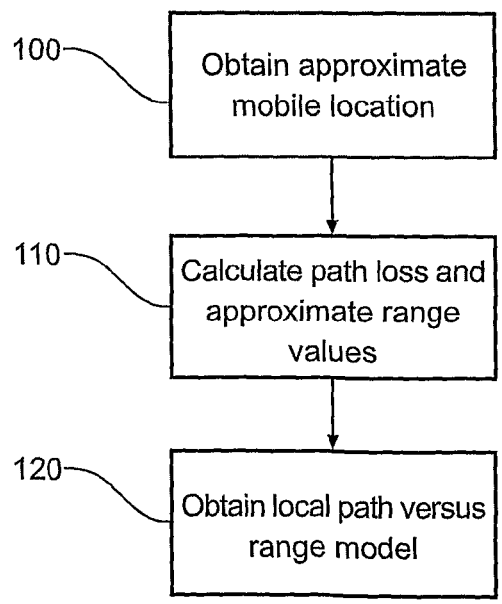
FIG. 2—shows the processing sequence of one method according to an aspect of the present invention.

A broad aspect of the steps of one aspect of the present invention is shown in FIG. 2. In this aspect of the invention, an initial, approximate location for the mobile 20 is obtained at step 100, without necessarily relying on the signal level measurements, although such signal level measurements could well be used in obtaining the approximate or estimated location (as will be discussed in more detail further below). In step 110, this estimate is then used to estimate the range r of the mobile 20 from each of the cells or BTSs measured by the mobile 20, and, using the known transmitted signal levels (for example, this information may be obtained from the network itself) to calculate the path loss for each measured signal, a set of path loss and range pairs is obtained. This set of path loss and range pairs is then applied to a path loss versus range model (such as in (1) above) in step 120, to derive a local model for the path loss versus range at the approximated mobile location. These steps are described in greater detail further below. It will be understood that the method could be carried out by using a single path loss and range measurement or estimate, or a plurality of path loss and range measurements or estimates.

Figure 3:
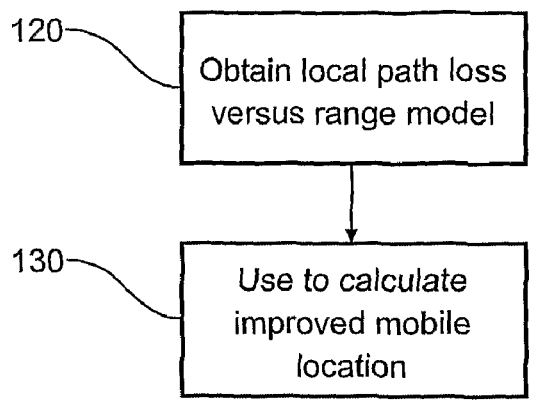
FIG. 3—shows the processing sequence of a method according to another aspect of the present invention.

According to another aspect of the present invention, the derived local path loss model can be used to determine a more accurate location of mobile 20. This additional step is shown as step 130 in FIG. 3, and is described in more detail below. In this aspect, it will be appreciated that the improved mobile location may be calculated as a sequence final sequence of obtaining the local path loss model or as a separate step, using a previously-determined local path loss model.

Figure 4:
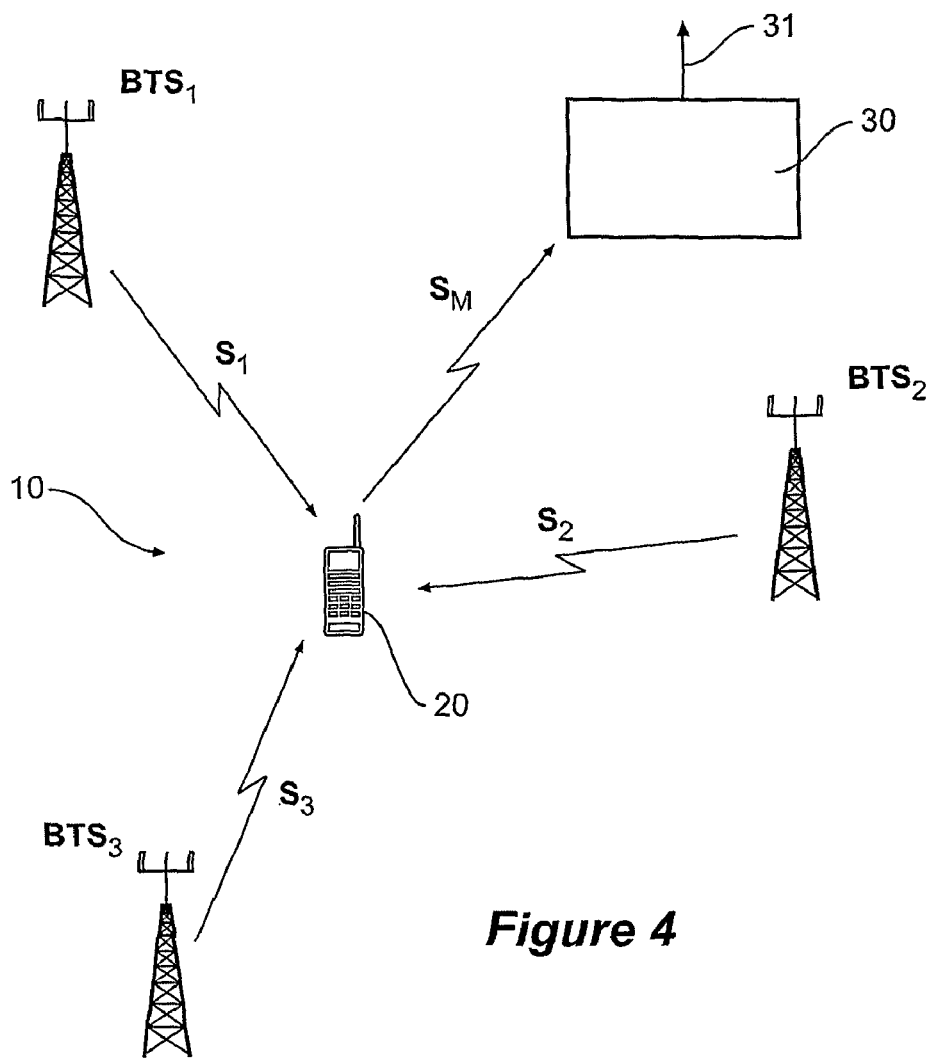
FIG. 4—shows another possible arrangement of elements used in the method of one aspect of the present invention.

It will be appreciated that the elements of the network 10 and mobile 20 could be arranged and interact in a number of different ways to that of FIG. 1. In FIG. 4, mobile 20 detects signals $S_1$, $S_2$ and $S_3$ from $BTS_1$, $BTS_2$ and $BTS_3$ respectively, and then sends this detected data via signal $S_M$, to a serving cell 30 for further processing. This detected data could be the raw data collected by mobile 20, or processed data. For example, the raw data could be the signal levels of $S_1$, $S_2$ and $S_3$, which it then sends to serving cell 30 for calculating respective ranges and path loss calculations. The serving cell 30 could also host the software for calculating the local path loss model and also for then using the calculated local path loss model to calculate the improved location of the mobile 20. In this case, the serving cell 30 could then transmit 31 the path loss model and/or the improved mobile location to other parts of the network 10 or to a destination external to the network 10.

Figure 5:
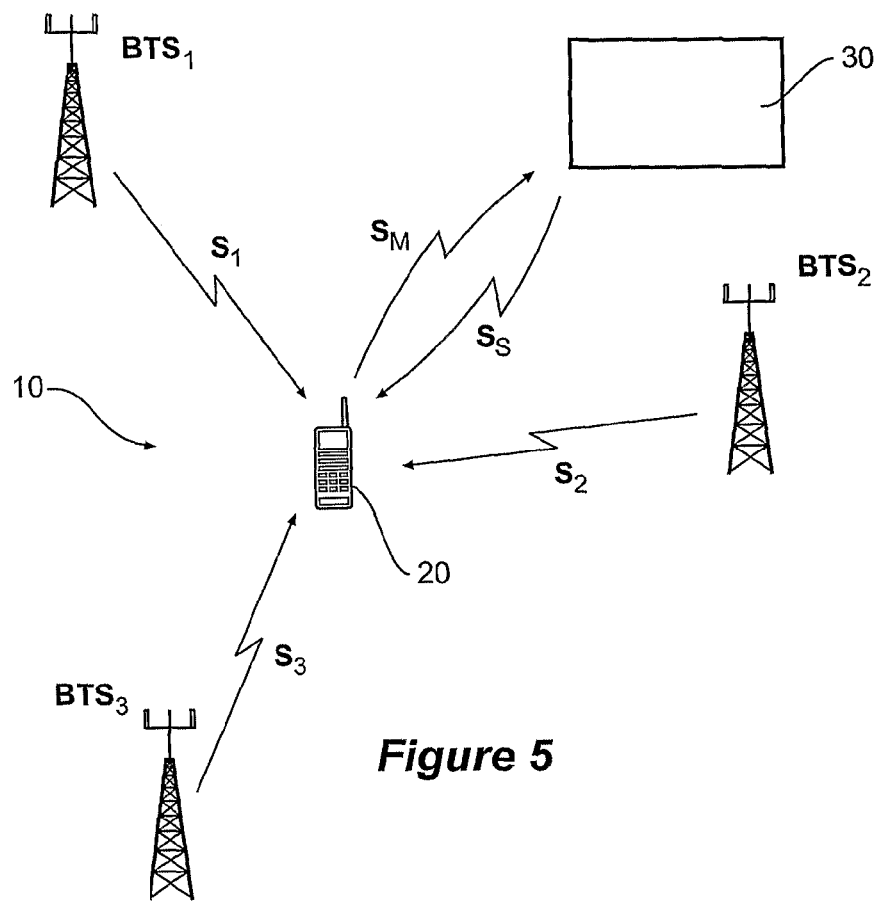
FIG. 5—shows a further possible arrangement of elements used in method of an aspect of the present invention.

In yet another form, and as shown as FIG. 5, the serving cell 30 could transmit via signal $S_s$, the calculated improved location of mobile 20 to the mobile 20 itself, which it could then inform its user (not shown) of its location (for example by means of a video display unit, or by synthesised voice or other means).

In a further form, serving cell 30 could transmit to mobile 20 the calculated path loss model, from which mobile 20 could then calculate its own improved location using the newly acquired path loss model.

In yet a further form, mobile 20, if equipped with sufficient processing power, could make its own approximate location measurements, calculate an improved local path loss model and use this to calculate its own improved location, all without the use of an external processor. This arrangement would be as shown in FIG. 1.

The software for performing the above calculations could therefore be hosted by a number of different machine readable mediums, whether it be an element of the network 10 such as in serving cell 30, a memory of the mobile 20 itself, on a Subscriber Identity Module (SIM) card of the mobile, or distributed among different elements.

It will also be understood that the method could be applied using measurements from any number of transmitters/BTSs, including only one transmitter, or any number of plurality of transmitters/BTSs.

Figure 6:
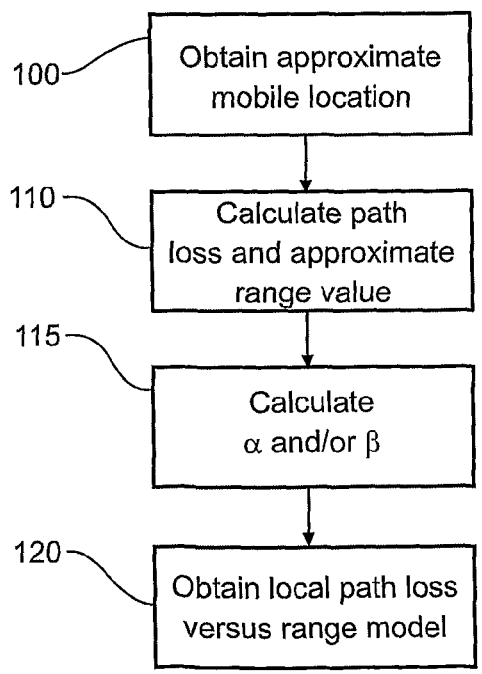
FIG. 6—shows a processing sequence of a method according to a further aspect of the present invention.

In one aspect, the step of determining the improved local model involves determining values for one or both of the parameters α or β. This additional step is shown as step 115 in FIG. 6.

There are a number of possible methods of estimating either or both the non-range dependent (β) and range dependent (α) parameters or components of the model. This leads to several options for a positioning system as follows:

In order to obtain a value for α, one or more of the following methods may be employed:

Use a general value of α for the region—There are many published results with measured path loss versus range data. Using this publicly available data, it is possible to select a value for α on a per region basis. This might mean for instance be the location system having a table of α values versus cell sites and selecting the value based on the cell serving the mobile 20 at the particular instant the location is to be computed.

Estimate α from the measurements from a single mobile—If two or more signal levels have been measured by the mobile 20, it is possible to estimate both α and β. For example, in the case where a mobile 20 is at a location where amongst the measurements made are the received signal strengths from n transmitters (or BTSs), an estimate of the location of the mobile 20 is made and referred to as (x, y). The location of the ith transmitter is $(x_i, y_i)$. Thus the range from the mobile to each of the transmitters can be estimated:

$$r_i = ((x-x_i)^2 + (y-y_i)^2))^{1/2} \quad (2)$$

The measured signal strength from transmitter i is denoted $L_i$. Equation (1) is a predictive model of the received signal strengths (3). The difference between the measured and predicted values is an error/noise term (4):

$$L_p(r_i) = \beta + \alpha * 10 * \log 10 \, (r_i) \quad (3)$$

$$L_p(r_i) = L_i + e_i \quad (4)$$

Combining (3) and (4) provides a set of n equations (5) with 2 unknowns ($\alpha$ and $\beta$).

$$L_i = \beta + \alpha * 10 * \log 10 \ (r_i) - e_i \quad (5)$$

Equation (5) is in a form common to numerical estimation problems for which there are many solution approaches known in the art. For the special case where n=2, the set of equations can be solved algebraically to provide a solution for $\alpha$ and $\beta$. Where n>2, the set of equations is said to be overconstrained and it is unlikely that there will exist a single solution that satisfies all n equations.

One possible approach is the maximum likelihood estimator. In this approach, the measurement errors are assumed to belong to a given statistical model (for example, a single model for all measurements, or a range-dependent model—one for each measurement). The solution then provides estimates of $\alpha$ and $\beta$ that are the most likely to have resulted in the given set of measurements based on the measurements and confidence assigned to the random elements associated with each equation.

The estimates of $\alpha$ and $\beta$ improve as the number of measurements n increases. An improvement in either $\alpha$ or $\beta$, alone, can be achieved by assigning one of the parameters a general value based on the published models and using the available measurements to get a better estimate of the other parameter.

Estimate $\alpha$ using the measurements from multiple mobiles

Since the range dependence of the path loss is likely to be common to all mobiles in a given vicinity, it is possible to group measurements from mobiles to obtain an estimate of the range dependence represented by $\alpha$. For instance the location system could accumulate all actual path loss measurements together with the estimated ranges derived from the position solutions. Similarly the location could accumulate path loss measurements and estimated ranges for mobiles whose initial position estimate lies within a nominated vicinity. Another variation is a combination of both. Within the set of measurements, a mobile is not precluded from appearing more than once. The vicinity over which measurements are grouped could be defined to be a cell sector, a group of cells, or any other bounded area such as a regular grid. With a sufficiently large set of measurements the individual variations could be reduced to obtain an accurate trend for path loss versus range.

For example, in the case of a set of mobile phone measurements for which the mobile's position estimate or approximation lies within a region denoted G. For the mobile denoted m lying within this region, there is a set of $n_m$ signal strength measurements $L_{ij}$, m range estimates $r_{ij}$ using the initial or final location estimate and equation (2). If there are M mobile phone measurement sets available then the total number of signal strength measurements N in G is $$N = \sum_{k=1}^{M} n_k \quad (6)$$

In the same manner as that described by equations (3) and (4), an equation in terms of $\alpha$ and $\beta$ can be derived for each of the N signal strength measurements:

$$L_{ij} = \beta_j + \alpha_G * 10 * \log 10 \ (r_{ij}) - e_{ij} \quad (7)$$

Where $\alpha_G$ is the $\alpha$ assumed constant across region G; $\beta_j$ is the $\beta$ value for phone j.

$r_{ij}$ is the range estimate from the jth mobile to the transmitter of the ith signal measured by the jth mobile.

$e_{ij}$ is the difference between prediction and measurement (assumed to be noise)

This provides two options: i) if $\beta$ is assumed to be approximately constant for all phones in the region; or ii) if $\beta$ is assumed as constant on a per measurement set basis.

i) Treating $\beta$ as approximately constant across a region:

As discussed earlier, $\beta_j$ can be considered to constituted by a general component $\beta_{gen}$ and a user component $\beta_{user}$, the former being a component related to the environment and common to all mobiles in the nominated region (in this case region G); the latter being common to all measurements from a given mobile at a given time. The size of the region can be chosen such that the $\beta_{gen}$ can be considered approximately constant across the region allowing $\beta$ to be considered as a random variable with a mean ($\beta_{gen}$) and a random component $\beta_{user}$.

Equation (7) becomes:

$$L_{ij} = \beta_{gen} + \alpha_G * 10 * \log 10 \ (r_{ij}) - \xi_{ij} \quad (8)$$

Where $\xi_{ij}$ is a noise term which combines the effects of per user $\beta_{user}$ variation and variations in signal level measurements.

$\beta_{gen}$ is the range independent path loss component assumed common to all mobiles in the region G.

$\alpha_G$ is the range dependent path loss component for the region G.

The set of equations can be solved using techniques such as maximum likelihood as discussed earlier and as will be apparent to the person skilled in the art. If a suitable value of $\beta_{gen}$ is available, for example from, but not limited to, published data or previously estimated values, then the equations may be solved for a single unknown $\alpha_G$. If a value for $\beta_{gen}$ is not available then the equations are solved for two unknowns, $\beta_{gen}$ and $\alpha_G$.

ii) Treating $\beta$ as approximately constant measurement set:

In scenarios where $\beta_{gen}$ cannot be considered constant across a region but can be considered to have a component that is constant per measurement set, then the equation (7) applies without modification. For a grouping of M measurement sets the techniques discussed are used to solve for M+1 unknowns; M×$\beta j$ and 1×$\alpha_G$.

Once a value of $\alpha$ has been estimated, it can be used to estimate a value for $\beta$ based on a set of measurements from a mobile. Using the same process as for equations (3) and (4) results in the set of equations (9) for the signal strength measurements $L_i$ made by a given mobile $$L_j = \beta + \alpha * 10 * \log 10 \ (r_i) - e_i \quad (9)$$

Using the techniques discussed previously, this set of equations can be processed to provide an estimate of $\beta$ for the measurement set. This will provide for the correction of user specific effects operating in common on all the signal level measurements. This can account for attenuation due for instance to in-building or in-vehicle reception or body losses.

For the more specific case where $\alpha$ is estimated separately for each, $\beta$ is estimated by first determining which region the mobile is in based on a position estimate of the mobile and then using the $\alpha$ estimated for that region. For example, a mobile in region G would use $\alpha_G$ when calculating $\beta$.

It is also possible to leverage historical measurements. As part of determining the range dependent trend to obtain $\alpha$, use can be made of residuals from the trend fit. These residuals represent the non-range dependent path loss effects as well.

As discussed earlier, this range is likely to be relatively large due to the significant effect of phenomena such as in-building reception. Nevertheless, having identified these typical ranges, these can be employed to screen rare, spurious estimates of $\beta$ arising for example from erroneous measurements. In the event that, a suspicious value of $\beta$ is identified, the estimate to the nearest limit of the expected range can be removed. Alternatively, a lower confidence value can be associated with the signal level constraints when calculating the location.

Turning now to a particular example employing some of the methods referred to above, the first step is to obtain an approximate location of the mobile 20 in the network 10. This may be done in several ways.

In one example, the approximate location of the mobile 20 may be derived from a set of signal parameter measurements which could include one or more of the following:
- One or more serving cell identifiers
- One or more round trip delay measurements relating to a serving cell
- One or more Neighbour cell identifiers
- One or more RTDs Using the available measurements, excluding those that represent a signal level, an approximate location for the mobile 20 is computed. Methods for computing such an estimate are commonly known in the art. Other more precise forms of location may also be used, such as those described in co-pending PCT application no. PCT/AU2005/01358, the contents of which are herein incorporated by reference. It will also be appreciated that other forms of location not requiring parameter measurements may also be used including approximate location by Global Positioning System (GPS).

Thus data to provide an approximate location of the mobile 20 may be obtained from within the network 10 itself, or external to the network 10 such as by GPS.

Using this approximate location, a range estimate is computed for each of the cells for which a signal level measurement is available.

Using the known transmitted level of each cell, the antenna gain at the transmitter and the corresponding measured received levels, an estimated path loss value can be obtained for each range. The antenna gain values used in this step may be obtained by taking into account the antenna gain pattern for the transmitting base station location and the relative heading to the mobile 20 based on its location obtained earlier. Any antenna gain at the receiver is absorbed into the $\beta$ value as it is a constant for any given phone and hence constant for any given set of measurements. The signal loss along the propagation path is given by:

$$L = P_t - P_r + G_t - G_r \quad (10)$$

Where L is the measured path loss (dB), $P_t$ is the transmit power (dBm), $P_r$ is the received power (dBm), $G_t$ is the transmit antenna gain in the direction of the estimated position of the mobile (dBi), and $G_r$ is the antenna gain of the mobile (dBi).

The set of path loss measurements has a corresponding transmitter-range estimate (equation 2) derived from the estimated mobile position. From these (path-loss, range) pairs, a locally tailored version of a general path loss model is computed using one of the formulations described above based on the data available.

The locally tailored path-loss model and path loss measurements are then used to generate a new position estimate for the mobile 20. For example, the path loss measurements can be treated as estimates of the range from the transmitter to the mobile thus constraining the mobile to a circular locus. Rearranging the path loss model (equation 1) gives a transmitter-to-mobile range estimate for measurement number i The range estimate can be modeled as the true range plus an error term:

$$r'_i = 10^{\wedge}[(L_i - \beta')/(\alpha' * 10)] \quad (11)$$

where $\alpha'$ and $\beta'$ are the parameters for the locally tailored model, $L_i$ is the measured path loss and $r'_i$ is the range estimate based on the path loss and local path loss model.

$$r'_i = r_i + e_i \quad (12)$$

$$r'_i = ((x-x_i)^2 + (y-y_i)^2))^{1/2} + e_i \quad (13)$$

where $r_i$ is the true (unknown) range to the transmitter from the mobile and $e_i$ is the error between the range estimate and the true range, (x, y) is the true (unknown) mobile location and $(x_i, y_i)$ is the location of the BTS transmitter.

The presence of the errors means that is it highly unlikely that the circular loci will intersect at a unique point. To generate a position estimate, numerical techniques well known in the art are used. One such method is the Maximum Likelihood estimator which provides the most likely position based on the range estimates and the probability models chosen for each of the range errors. The signal strength based circular loci can also be combined using the same estimation techniques with loci generated from other sources such as round-trp times (eg TA in GSM and RTT in UMTS) and RTDs.

Finally a more accurate location estimate is computed, using the locally tailored version of the path loss model as will be understood by the person skilled in the art.

The preceding description assumes a simple scenario. The following describes circumstances with several variations to the simple situation discussed above.

Calibrating Either $\alpha$ or $\beta$ or Both

As described previously, depending on the number of signal level measurements available, it is possible to calibrate both the range dependent and non-range dependent components of the model. For example, for fewer than 6 measurements, one may elect to only calibrate $\beta$, and to obtain a suitable value for $\alpha$ from an alternative source (such as published tables for example).

As also discussed above there are several options other than calibration from the measurements available, for obtaining a suitable value of $\alpha$. The particular implementation selected may be determined based on several factors including processing resource considerations. In the absence of any other constraints, it is possible to accumulate measurements as described above, grouping them according to region and estimating a common, representative value of $\alpha$ per region. However in some cases this may not be feasible and a suitable value for $\alpha$ may be selected from data available in the public domain, based on the local characteristics.

Using Multiple Measurement Sets

In some applications, multiple sets of measurements may be reported by a mobile in a short period. For the second and subsequent measurements, improved performance can be achieved by accumulating the signal measurements from all measurement sets up until that point and estimating $\beta$ from this larger set of observations.

Improved Approximate Position

Any improvement in the initial approximate position used to estimate the path loss model parameters is likely to result in a more useful path loss model. Therefore rather than excluding the signal level measurements from the initial location calculation, it is also possible to use a less well tuned path loss model to enable these values to be included. One option for this, if the location system is accumulating measurements according to region, is to select representative values from the historical data in the region of interest. An alternative option, where historical data is not available is to use a more generally representative value of β but adjust the importance assigned to the signal level measurements in the initial position calculation to reflect the lower confidence in the corresponding position constraints.

Measurements in Dual Band Networks

In some cases, signal level measurements reported by a mobile may relate to signals from a dual band network. In other words the carrier frequencies for some of the measurement, are sufficiently different from the others to necessitate an additional frequency dependent term in the path loss model. Using the general form of the model as described above, this effect would be incorporated in the β term. Note that the physics of radio propagation is such that α is not frequency dependent.

While possible, the estimation for β for the two frequency bands would not normally be done together, as the relationship between frequency and path loss is approximately constant in many models. Rather, the path losses from one frequency band are adjusted to be comparable to those of the other frequency band. For the purposes of explaining this aspect of the present invention, all of the range independent path loss parameters have been lumped into a single parameter β. Within the path loss models the range independent terms include a component of the form $C \log_{10} f$ where C is a constant and $f$ is the carrier frequency. In a dual band network with carrier frequencies $f_1$ and $f_2$ and that $f_1 < f_2$, signals carried on f2 will experience a greater path loss than those on f1.

When measured in dB this difference is a constant ($L_\Delta$):

$$L_\Delta = C \log_{10}(f_2/f_1) \quad (14)$$

The measured signal strengths are then adjusted. For signals made in the $f_1$ band $$L_m' = L_m \quad (15)$$

For signals made in the $f_2$ band $$L_m' = L_m - L_\Delta \quad (16)$$

The value for β' is now determined by using equation (5) but with the modified measurements $L_m'$. For use in the local propagation model and subsequent position estimation, the b' value is corrected for the carrier frequency.

The measured signal strengths are then adjusted. For signals made in the $f_1$ band $$\beta = \beta' \quad (17)$$

For signals made in the $f_2$ band $$\beta = \beta' + L_\Delta \quad (18)$$

In an example, a dual-band GSM handset operating at 900 MHz and 1800 MHz and using the Hata model for C the path loss for 1800 MHz signals will be 8 dB higher than if the same signal was using a 900 MHz carrier. Therefore, using the above method, $f_1 = 900$ MHz, $f_2 = 1800$ MHz, resulting in $L_\Delta = 8$ dB.

It will be appreciated that the above process can be extended in the case of measurements from more than 2 frequency bands.

Using Historical Measurements to Provide an Indication of Signal Level Variance for Use in the Location Calculation The majority of location algorithms utilising signal level measurements will incorporate some representation of the uncertainty associated with these measurements. This is done in order to appropriately weight the corresponding position constraints against the constraints derived from other measurements such as round trip delays.

In the absence of any other information, a reasonable model for the uncertainty would be to assume that the signal level measurements are log normally distributed around a notional local mean with a standard deviation of 9 dB. (Note that small scale variations caused by fast fading are specifically excluded from this consideration on the assumption that these are sufficiently reduced by averaging during the measurement process to be negligible). As will be understood, the degree of variation from the local mean level depends amongst other factors, on the local environment. It is common with such models to reduce the variation in rural areas to 6 dB and increase it to as much as 12 dB in dense environments.

For a system employing a path loss model tailored as described in this invention, a further contribution to this uncertainty arises from the degree to which the tailored model fits the local phenomena. Therefore, if a historical record of measurements is maintained, it is possible for the location calculation to be provided with estimates of the uncertainty both in the model fit as well as in the measurements observed in the region of interest. Using a more accurate representation for the uncertainty than simply a fixed standard deviation will yield more accurate location estimates.

The results of a simulation of a method of the present invention are provided below. The simulation had the following characteristics:

Base stations (BTSs) separated approximately 1000 meters apart.

Hata propagation model, which included the two parameters, α and β

The log of the received signal levels had a Gaussian error with a standard deviation of 9 dB, The error on the round trip timing was assumed to be Student's t with two degrees of freedom, and median of 300 meters, and a scale factor of 300 meters.

The simulated mobile was then moved to a random position in a 500 meter square, centred on the origin. For each realisation, the reception of signal measurements from seven base stations was simulated, with one TA measurement from the serving cell.

For each realization, the initial position was estimated using three different methods:

1. Using a maximum likelihood method to estimate the location using the TA and the signal strength measurements but with a beta that was 10 db different from the true value of β.
2. Combining the TA value to estimate distance and the centre line of the sector in order to provide a simple estimate of the location which did not depend on β. Using this estimate, the error in β was able to be estimated.
3. Using a maximum likelihood method to estimate the location using the TA and the signal strength measurements, but using the β correction estimated in method 2.

One thousand realizations were carried out and then the root mean square errors were statistically analysed. The results were as follows

|  | 67th percentile | 95th percentile |
| --- | --- | --- |
| Method 1 | 461 meters | 2000 meters |
| Method 2 | 648 meters | 854 meters |
| Method 3 | 427 meters | 917 meters |
| Percentage Improvement | 7.4 | 54 |

The percentage improvement refers to differences between method 1 and method 3. It can be seen that there is a considerable improvement, especially at the 95th percentile statistic. It will be appreciated that these performance statistics are indicative only. The performance improvements are affected by many factors including the network geometry and radio frequency plan.

The preceding descriptions frequently use the GSLI system to illustrate the operation of the invention. It will be understood that this is not to be construed as a limitation of the method however, and can equally be applied to other systems. For example, in the case of UMTS, the mobile may be tasked to measure and report port intra-frequency cells as well as specific inter-frequency cells. The absence of particular cells in the approximate vicinity of the mobile can be used with this approach for enhanced cell ID positioning. It will be appreciated that system specific characteristics such as adjacent channel rejection factors, mobile sensitivity thresholds etc. have to be set appropriately for the system under consideration as will be apparent to the person skilled in the art.

The enhanced location measurements obtained by the present invention may be useful in many applications, including, but not limited to: Self navigation (for example as an alternative to GPS systems); Location Based Services (LBS) in which a telecommunications service provider can tailor communication and other services depending upon the subscriber's location at any one time; emergency/rescue location services; tracking of individual persons, for example to alert a parent that her child carrying a mobile phone has travelled outside of a "safety zone" of a path between the child's home and the child's school; transport fleet management systems, and any other application where knowledge of the location of a mobile or a person associated with a mobile may be used.

The present invention provides an effective method for utilising signal level measurements without requiring a database constructed by detailed, expensive surveys or other forms of detailed calibration. The effect of one aspect of the invention is to obtain a correction for the most significant deviations in the measured signal levels, those deviations operating in common on the signals measured by the mobile. These measurements are then employed with the correction to obtain a more accurate location estimate than could be obtained if the deviations were simply neglected.

It will be understood that the term "comprise" and any of its derivatives (eg. comprises, comprising) as used in this specification is to be taken to be inclusive of features to which it refers, and is not meant to exclude the presence of any additional features unless otherwise stated or implied.

The claims defining the invention are as follows:

1. A system for locating a mobile radio terminal by obtaining a local path loss versus range model for a radio communications network comprising:
   a processor;
   a memory in communication with the processor, wherein the memory includes non-transitory instructions stored therein to cause the processor to execute the steps of:
   obtaining an approximate location of a mobile radio terminal;
   obtaining a set of radio signal parameter measurements taken by the mobile radio terminal, the set including at least one path loss and corresponding range measurement;
   applying the at least one path loss and corresponding range measurement to a path loss versus range model to obtain a local path loss versus range model for the approximate location of the mobile radio terminal; and
   in the processor, calculating an updated location of the mobile radio terminal using the local path loss versus range model with at least one path loss measurement corresponding to the approximate location, wherein the updated location is more accurate than the approximate location.

2. The system of claim 1 wherein:
   the step of obtaining the set of radio signal parameter measurements comprises obtaining a range of the mobile radio terminal at the approximate location of the mobile radio terminal from one or more transmitters in the radio communications network; and
   the step of applying the at least one path loss and corresponding range measurement to a path loss versus range model comprises applying the at least one path loss and corresponding range measurement at the approximate location to the path loss versus range model to obtain the local path loss versus range model for the approximate location of the mobile radio terminal.

3. The system of claim 2 wherein the step of obtaining the set of radio signal parameter measurements comprises measuring a signal level at the mobile radio terminal transmitted by the one or more transmitters.

4. The system of claim 3 wherein the path loss versus range model comprises a range dependent component.

5. The system of claim 4 wherein the path loss versus range model comprises a non range dependent component.

6. The system of claim 4 wherein the path loss versus range model comprises both a range dependent and a non range dependent component.

7. The system of claim 6 wherein the path loss versus range model is on the form:

$$L_p(r) = \beta + \alpha * 10 * \log 10\,(r)$$

Where:
   $L_p$ is the path loss given in units of decibels;
   $\beta$ is a non-range dependent term characteristic of the local environment;
   $\alpha$ is the parameter defining the range dependence; and
   r is the range.

8. The system of claim 7 further comprising estimating the range dependent component and/or the non-range dependent component of the path loss versus range model.

9. The system of claim 7 wherein $\beta$ comprises a general non-range dependent component $\beta_{gen}$ and a user non-range dependent component $\beta_{user}$.

10. The system of claim 7 wherein $\alpha$ is obtained from published data.

11. The system of claim 7 wherein $\alpha$ is obtained from one or more measurements from the radio mobile terminal.

12. The system of claim 7 wherein $\alpha$ is obtained from one or more measurements from a plurality of radio mobile terminals in the vicinity of the radio mobile terminal.

13. The system of claim 7 wherein $\alpha$ is obtained from one or more measurements from the radio mobile terminal and from one or more measurements from a plurality of radio mobile terminals in the vicinity of the radio mobile terminal.

14. The system of claim 10 wherein $\beta$ is obtained using the obtained value for $\alpha$.

15. The system of claim 1 wherein the step of obtaining the approximate location of the mobile radio terminal comprises use of one or more of the following parameters:
   one or more serving cell identifiers;
   one or more round trip delay measurements relating to a serving cell;
   one or more Neighbour cell identifiers; and
   one or more RTDs.

16. The system of claim 1 wherein the step of obtaining the approximate location of the mobile radio terminal comprises obtaining the approximate location of the mobile radio terminal externally from the radio communications network.

17. The system of claim 1 wherein:
the step of obtaining a set of radio signal parameters comprises obtaining a set including a plurality of path loss and corresponding range measurements corresponding to the approximate location;
the step of applying the at least one path loss and corresponding range measurement to a path loss versus range model comprises applying the plurality of path loss and corresponding range measurements to obtain the local path loss versus range model for the approximate location of the mobile radio terminal; and
the step of calculating the updated location comprises using the local path loss versus range model with at least one of the plurality of measurements corresponding to the approximate location to determine an updated corresponding range.

18. The system of claim 1 wherein:
the step of obtaining a set of radio signal parameters comprises obtaining a set including a plurality of path loss and corresponding range measurements;
the step of applying the at least one path loss and corresponding range measurement to a path loss versus range model comprises applying the plurality of path loss and corresponding range measurements to a maximum likelihood estimator to determine at least one of a range dependent term and a non-range dependent term to obtain the local path loss versus range model for the approximate location of the mobile radio terminal; and
the step of calculating the updated location comprises using the local path loss versus range model with at least one of the plurality of measurements corresponding to the approximate location to determine an updated corresponding range.

19. A processor-implemented method for locating a mobile radio terminal by obtaining a local path loss versus range model for a radio communications network, the method comprising:

obtaining an approximate location of a mobile radio terminal;
obtaining a set of radio signal parameter measurements taken by the mobile radio terminal, the set including at least one path loss and corresponding range measurement;
in the processor, applying the at least one path loss and corresponding range measurement to a path loss versus range model to obtain a local path loss versus range model for the approximate location of the mobile radio terminal; and
in the processor, calculating an updated location of the mobile radio terminal using the local path loss versus range model with at least one path loss measurement corresponding to the approximate location, wherein the updated location is more accurate than the approximate location; and
transmitting the updated location to a destination via a network.

20. A tangible, non-transitory, machine readable medium having instructions thereon to cause at least one machine to perform a method comprising:
obtaining an approximate location of a mobile radio terminal;
obtaining a set of radio signal parameter measurements taken by the mobile radio terminal the set including at least one path loss and corresponding range measurement;
applying the at least one path loss and corresponding range measurement to a path loss versus range model to obtain a local path loss versus range model for the approximate location of the mobile radio terminal; and
calculating an updated location of the mobile radio terminal using the local path loss versus range model with at least one path loss measurement corresponding to the approximate location, wherein the updated location is more accurate than the approximate location.

* * * * *

UNITED STATES PATENT AND TRADEMARK OFFICE
CERTIFICATE OF CORRECTION

PATENT NO. : 8,355,737 B2
APPLICATION NO. : 11/886515
DATED : January 15, 2013
INVENTOR(S) : Macnaughtan et al.

It is certified that error appears in the above-identified patent and that said Letters Patent is hereby corrected as shown below:

IN THE CLAIMS

At claim 7, column 14, line 32, after the word "is" delete "on" and insert therefor -- of --.

Signed and Sealed this
Fourteenth Day of May, 2013

Teresa Stanek Rea
*Acting Director of the United States Patent and Trademark Office*